Jan. 8, 1924.　　　　　　　　　　　　　　1,480,213
F. A. LEUI
NUT LOCK
Filed June 13, 1923

Inventor
F. A. Leui

By　[signature], Attorneys

Patented Jan. 8, 1924.

1,480,213

UNITED STATES PATENT OFFICE.

FOSTER A. LEUI, OF COMSTOCK, NEBRASKA.

NUT LOCK.

Application filed June 13, 1923. Serial No. 645,181.

*To all whom it may concern:*

Be it known that I, FOSTER A. LEUI, a citizen of the United States, residing at Comstock, in the county of Custer and State of Nebraska, have invented certain new and useful Improvements in Nut Locks, of which the following is a specification.

My invention relates to nut locks and has for its object the provision of a simple, inexpensive and efficient device which may be readily applied to a bolt and turned thereon with the nut and, when applied, prevent relative reverse rotation of the nut or the bolt. A particular object of the invention is to provide a lock of novel construction which may be disposed within the lines of the nut and held by projections thereon so as to encircle the bolt and rotate readily upon the same when being applied but effect locking engagement therewith upon a reverse rotation. The invention is illustrated in the accompanying drawing and will be hereinafter fully set forth.

Figure 1:
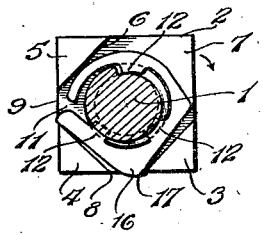
Figure 1 is a plan view of a nut and lock embodying my invention applied to a bolt which is shown in transverse section.
Figure 2:
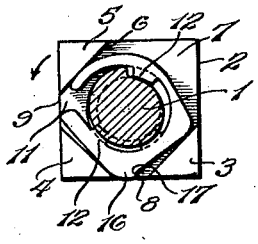
Fig. 2 is a similar view showing the lock in locking engagement with the bolt.
Figure 3:
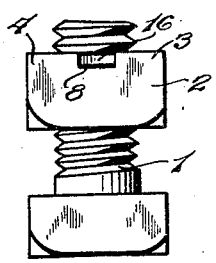
Fig. 3 is a side elevation.
Figure 4:
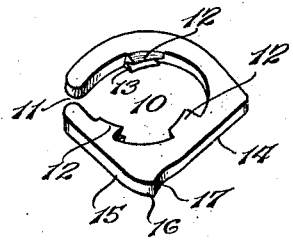
Fig. 4 is a detail perspective view of the lock removed.

In the drawing, the reference numeral 1 indicates a bolt which is of the usual construction and is to be inserted through parts to be secured in the usual manner. 2 designates a nut which is applied to the bolt in the ordinary manner and has flat sides so that it may be readily engaged by a wrench or other turning tool, as usual. The outer end of the nut is provided at three corners with lugs or projections 3, 4 and 5 which have flat inner faces 6 disposed obliquely relative to the sides of the nut so that the lugs or projections have a triangular form, as clearly shown in Figs. 1 and 2. One corner of the nut is entirely open, as shown at 7, and between the adjacent edges of the lugs are spaces 8 and 9, the purpose of which will presently appear. The lock 10 is constructed of spring metal and may be generally described as a split ring having its ends spaced apart, as shown at 11, the central opening of the ring being provided at intervals with inwardly projecting teeth or lugs 12 having a grooved or threaded formation, as shown at 13, whereby they are adapted to engage the threads of the bolt. The engaging edges of the lugs are disposed eccentric to the inner circumference of the ring so that they present wedge-like or inclined surfaces to the bolt when being applied and, when the nut is being turned onto the bolt, as indicated by the arrow in Fig. 1, the lugs or teeth will be pushed outwardly with respect to the bolt so that the lock will ride readily thereon. Upon reverse rotation of the nut, however, the larger ends of the lugs will be caused to bite into the threads of the bolt, as shown in Fig. 2. The resiliency of the lock tends to move the ends thereof apart and, when the nut is being turned onto the bolt, the open space 7 upon the nut will accommodate the expansion of the ring so that the lugs or teeth 12 may be free of the bases of the threads on the bolt and binding engagement with the bolt will be avoided. Upon reverse rotation of the nut, as indicated by the arrow in Fig. 2, one free end of the ring will be brought against the adjacent oblique surface 6 of the nut and the ring will, therefore be held against the bolts so that the teeth will be brought into binding engagement therewith. In order that the lock may follow the movement of the nut, it is constructed with straight faces 14 and 15 meeting in a point 16 presenting a shoulder 17 which is adapted to be engaged by one wall of the space 8.

In assembling the parts, the lock is seated against the nut with the lug or tooth 17 between the walls of the space 8 and the ends of the lock adjacent the space 9 of the nut. The nut and the lock are then brought into engagement with the end of the bolt and the rotation of the nut will then carry the relatively rear wall of the space 8 against the shoulder 17, as shown in Fig. 1, so that the lock will rotate with the nut and the free ends of the lock will be accommodated adjacent the space 9 so that ample room for the expansion of the lock is provided. Upon reverse rotation of the nut, however, that wall of the space 8 which was previously the advance wall becomes the rear wall and will ride against the side of the tooth or lug 16 so that the lock will be relatively shifted to bring its more remote free end against the inclined surface 6 of the lug or projection 5 and the lock will be thereby relatively contracted so that the lugs or teeth 12 will be caused to effect binding engagement with the bolt and arrest the reverse movement of the nut or the bolt, as the case may be.

My device is exceedingly simple and may be readily applied to any bolt at a low cost. When applied, the lock will be entirely within the lines of the nut, as shown in the drawing, and it is, therefore, not apt to be broken or loosened by chance blows from objects or tools which may be moved about adjacent the bolt. Should it be necessary at any time to release the nut from the bolt, any convenient tool may be inserted between the ends of the lock and manipulated to pry the ends apart so as to withdraw the teeth 12 from the bolt and thereby free the lock so that reverse rotation can be imparted to the same and the nut.

Having thus described the invention, what is claimed as new is:

1. A device for locking nuts on bolts consisting of a split resilient ring provided on its inner circumference with eccentric teeth adapted to ride freely on the bolt when turned in one direction but bind upon the bolt when turned in the opposite direction, the ring being provided with means whereby to engage the nut and turn with the same.

2. The combination with a bolt, and a nut fitted thereon and provided upon its outer end with spaced lugs, of a split locking ring encircling the bolt and seated against the end of the nut between the lugs thereon, said ring being provided on its inner circumference with teeth adapted to engage the threads of the bolt and provided externally with a lug adapted to engage between two of the lugs on the nut, the space between two of the lugs providing for expansion of the lock.

3. The combination with a bolt, and a nut mounted thereon and provided upon its outer end with spaced lugs, of a split resilient locking ring encircling the bolt and seating against the end of the nut between the lugs thereon, the said ring being provided upon its inner edge with teeth to engage the threads of the bolt and provided upon its outer edge with a lug to engage the walls of the space between two of the lugs on the nut, the end of the ring more remote from said lug being adapted to ride upon the inner face of a remote lug upon the nut whereby the teeth on the ring will be caused to lockingly engage the threads of the bolt.

4. The combination of a bolt, a nut fitted thereon and provided on its outer end with spaced lugs having relatively oblique flat inner sides, and a split resilient locking ring provided upon its inner edge with spaced teeth adapted to ride upon the threads of the bolt when the nut and the lock are turned in one direction and to bind upon the said threads when the nut and the lock are turned in the opposite direction, the lock being provided with a lug upon its outer edge to engage either of the adjacent lugs upon the nut and the more remote free end of the lock being adapted to engage against the oblique face of the lug on the nut adjacent the same when reverse rotation is imparted to the nut, the lock being further provided at opposite sides of the lug upon its outer edge with obliquely disposed straight faces to engage against the faces of the respectively adjacent lugs on the nut.

In testimony whereof I affix my signature.

FOSTER A. LEUI. [L. S.]